United States Patent
Trainin et al.

(10) Patent No.: US 9,736,773 B2
(45) Date of Patent: Aug. 15, 2017

(54) TECHNIQUES FOR POWER SAVING OPERATIONS IN A WIRELESS NETWORK

(71) Applicant: INTEL IP CORPORATION, Santa Clara, CA (US)

(72) Inventors: Solomon Trainin, Haifa (IL); Ophir Edlis, Modin (IL)

(73) Assignee: INTEL IP CORPORATION, Santa Clara, CA (US)

( * ) Notice: Subject to any disclaimer, the term of this patent is extended or adjusted under 35 U.S.C. 154(b) by 214 days.

(21) Appl. No.: 14/494,182

(22) Filed: Sep. 23, 2014

(65) Prior Publication Data
US 2016/0088555 A1 Mar. 24, 2016

(51) Int. Cl.
*H04W 74/08* (2009.01)
*H04W 52/02* (2009.01)

(52) U.S. Cl.
CPC ... *H04W 52/0209* (2013.01); *H04W 52/0216* (2013.01); *H04W 52/0238* (2013.01); *H04W 74/0816* (2013.01); *Y02B 60/50* (2013.01)

(58) Field of Classification Search
CPC ......... H04W 74/0816; H04W 52/0216; H04W 52/0238
See application file for complete search history.

(56) References Cited

U.S. PATENT DOCUMENTS

2002/0150095 A1* 10/2002 Sherman ........... H04W 74/0808
370/389
2008/0130622 A1* 6/2008 Hiertz .................. H04L 12/407
370/348
2012/0069781 A1* 3/2012 Wentink ............ H04W 72/1215
370/311

FOREIGN PATENT DOCUMENTS

WO 2015/099715 A1 7/2015

OTHER PUBLICATIONS

"Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band", IEEE, Version D9.0, Jul. 2012, 678 pages (Author unknown).

* cited by examiner

*Primary Examiner* — Hoon J Chung

(57) ABSTRACT

Various embodiments are generally directed to an apparatus, method and other techniques to initiate a transaction session at a transaction session start time to communicate a transaction between a first device and a second device, receive a first frame comprising information indicating an occurrence of another transaction session between other devices and a time reservation to reserve time for the other transaction session, receive a second frame comprising second information indicating a truncation of the other transaction session at a truncation time and before an expiration of the time reservation, and shift a subsequent transaction session start time for at least one subsequent transaction session between the first device and the second device based on a difference between the transaction session start time and the truncation time.

20 Claims, 13 Drawing Sheets

*900*

INITIATE A TRANSACTION SESSION AT A TRANSACTION SESSION START TIME TO COMMUNICATE A TRANSACTION BETWEEN A FIRST DEVICE AND A SECOND DEVICE
905

RECEIVE A FIRST FRAME COMPRISING INFORMATION INDICATING AN OCCURRENCE OF ANOTHER TRANSACTION SESSION BETWEEN OTHER DEVICES AND A TIME RESERVATION TO RESERVE TIME FOR THE OTHER TRANSACTION SESSION
910

RECEIVE A SECOND FRAME COMPRISING SECOND INFORMATION INDICATING A TRUNCATION OF THE OTHER TRANSACTION SESSION AT A TRUNCATION TIME AND BEFORE AN EXPIRATION OF THE TIME RESERVATION
915

SHIFT A SUBSEQUENT TRANSACTION SESSION START TIME FOR AT LEAST ONE SUBSEQUENT TRANSACTION SESSION BETWEEN THE FIRST DEVICE AND THE SECOND DEVICE BASED ON A DIFFERENCE BETWEEN THE TRANSACTION SESSION START TIME AND THE TRUNCATION TIME
920

*FIG. 9*

TECHNIQUES FOR POWER SAVING OPERATIONS IN A WIRELESS NETWORK

TECHNICAL FIELD

Embodiments described herein generally relate to techniques to avoid interference while communicating a wireless network.

BACKGROUND

Technological developments permit digitization and compression of large amounts of voice, video, imaging, and data information. The need to transfer data between devices in wireless communication requires transmission of a data transactions in diverse and dynamic environments at a high data rate. Wireless Personal Area Networks (WPAN) communication systems are extensively used for high data exchange between devices over short distances. Current WPAN systems exploit the frequency band in the 2-7 GHz frequency band region and achieve very high throughputs.

The availability of 7 GHz of unlicensed spectrum in the 60 GHz band and the progress in the semiconductor technologies are pushing the development of the mm Wave WPAN and mm Wave Wireless Local Area Network (WLAN) systems which will operate in the 60 GHz band and will achieve the throughputs of about several Gbps. Multi-gigabit speeds may enable high performance wireless data, display and audio applications that supplement capabilities of current wireless local area network (LAN) devices.

BRIEF DESCRIPTION OF THE DRAWINGS

FIG. 9 illustrates an exemplary embodiment of a fourth logic flow diagram.

DETAILED DESCRIPTION

Figure 1A:
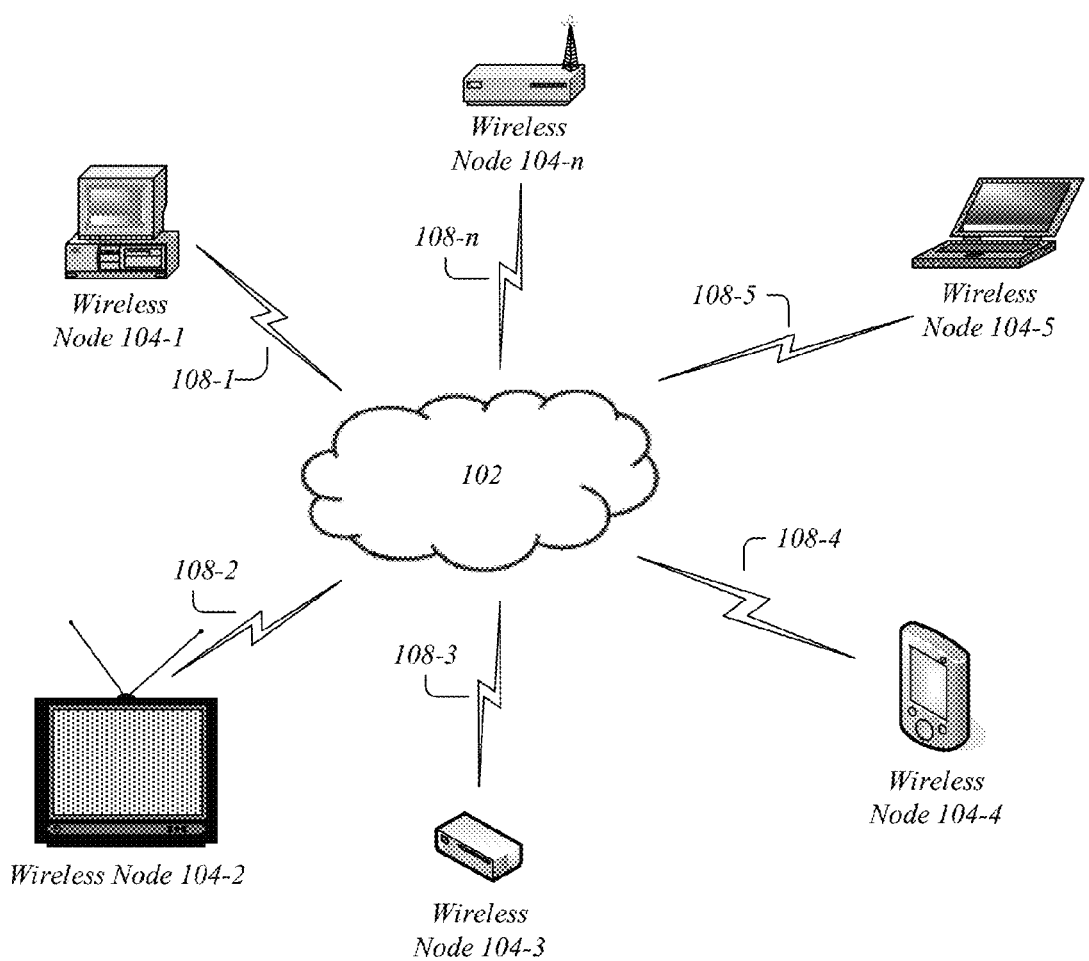
FIG. 1A illustrates an exemplary embodiment of a communication system.

Various embodiments are generally directed to an apparatus, system and method for energy efficient wireless communications. Some embodiments may be directed to operations according to one or more standards, such as those defined by the Wireless Gigabit Alliance Wireless Gigabit ("WiGig") Specification Version 1.0, according to Institute of Electrical and Electronics Engineers (IEEE) Draft Standard P802.11ad®/D9.0, published July 2012, titled "Amendment 3: Enhancements for Very High Throughput in the 60 GHz Band," ("IEEE 802.11ad Revision 9.0"), and/or according to any predecessors, revisions, or variants thereof (collectively, "the WiGig/802.11ad Standards"). It is to be understood that embodiments are also possible and contemplated that do not include a WiGig/802.11ad wireless network, and that the embodiments are not limited in this context.

Some embodiments may be directed to communicating a transaction during a transaction session between two or more wireless devices or stations. When communicating a transaction the stations may send and receive a number of frames to communicate information and data. Further, when communicating the transactions the stations may operate in a peer-to-peer private basic service set (PBSS) over one or more channels in a frequency spectrum that may be shared with other devices and/or stations. Thus, various embodiments may be directed to taking interference avoidance actions to avoid interference while communicating over the one or more channels and conserving power by efficiently scheduling and adjusting the communications of the transactions.

More specifically and in some exemplary embodiments, one or more stations in a PBSS may detect interference caused by other devices communicating a transaction. The detecting station may wait for the other devices to complete the transaction before it commences communication of its own transaction during a transaction session. The detecting station may also determine a difference between the completion of the communication of the transaction between the other devices and the start of its own transaction session. The difference may be used to adjust or shift subsequent transaction session start times for subsequent transaction sessions. By shifting a subsequent transaction session start time, the stations may realize significant power savings because they may remain in a standby mode of operation for a longer period of time. Further embodiments may be directed to communicating transaction session start times by utilizing a combination of frames, such as communicating a Grant frame followed by a contention-free end (CF-End) frame. These and other details will become more apparent in the following description.

Various embodiments also relate to an apparatus or systems for performing these operations. This apparatus may be specially constructed for the required purpose or it may include a general-purpose computer as selectively activated or reconfigured by a computer program stored in the computer. The procedures presented herein are not inherently related to a particular computer or other apparatus. Various general-purpose machines may be used with programs written in accordance with the teachings herein, or it may prove convenient to construct more specialized apparatus to perform the required method. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives consistent with the claimed subject matter.

FIG. 1A illustrates an exemplary embodiment a communications system 100. In various embodiments, the communications system 100 may include multiple wireless nodes 104-n communicating 108-n in a wireless network 102. A wireless node generally may include any physical or logical entity for communicating information in the communications system 100 and may be implemented as hardware only, software only, or any combination thereof, as desired for a given set of design parameters or performance constraints. Although FIG. 1A may show a limited number of nodes by way of example, it can be appreciated that more or less nodes may be employed for a given implementation.

The wireless network 102 may communicate information in accordance with one or more standards as promulgated by a standards organization. In some embodiments, for example, the wireless network 102 may include a 60 GHz multi-gigabit wireless network. For example, in various embodiments, communications system 100 may be implemented according to Wireless Gigabit Alliance Wireless Gigabit ("WiGig") Specification Version 1.0, according to Institute of Electrical and Electronics Engineers (IEEE) Draft Standard IEEE Std 802.11ad™-2012. It is to be understood that embodiments are also possible and contemplated that do not include a WiGig/802.11ad wireless network, and that the embodiments are not limited in this context.

The wireless network 102 may communicate, manage, or process information in accordance with one or more protocols. A protocol may include a set of predefined rules or instructions for managing communication among nodes. In various embodiments, for example, the wireless network 102 may employ one or more protocols such as a beam forming protocol, medium access control (MAC) protocol, Physical Layer Convergence Protocol (PLCP), Simple Network Management Protocol (SNMP), Asynchronous Transfer Mode (ATM) protocol, Frame Relay protocol, Systems Network Architecture (SNA) protocol, Transport Control Protocol (TCP), Internet Protocol (IP), TCP/IP, X.25, Hypertext Transfer Protocol (HTTP), User Datagram Protocol (UDP), a contention-based period (CBP) protocol, a distributed contention-based period (CBP) protocol and so forth. In various embodiments, the communications system 100 also may be arranged to operate in accordance with standards and/or protocols for media processing. The embodiments are not limited in this context.

As shown in FIG. 1A, the communications system 100 may include a network 102 and a plurality of wireless nodes 104-n, where n may represent any positive integer value. In various embodiments, the wireless nodes 104-n may be implemented as various types of wireless devices and stations. In some embodiments, wireless nodes 104-n may include mobile and/or fixed wireless devices capable of communicating according to a wireless communications protocol of communication system 100. In addition and in some embodiments, wireless nodes 104-n may include directional multi-gigabit (DMG) stations (STAs) operative to communicate over wireless network 102 according to the WiGig/802.11ad Standards.

In various embodiments, communications of wireless nodes 104-n over wireless network 102 may be managed and/or configured by a wireless node 104-n operating as a control node, which may be any one of the wireless nodes 104-n or a separate device (not shown), such as an access point or a base station. In some embodiments, a control node may include a personal basic service set (PBSS) control point (PCP) and/or an access point (AP) according to the WiGig/802.11ad Standards. In various embodiments, a control node may be operative to determine one or more communications parameters governing communication by one or more wireless nodes 104-n over wireless network 102. It is worthy of note that in some embodiments, a control node may itself include a communications device, and may operative to determine one or more communications parameters governing its own communication over wireless network 102. For example, in various embodiments, a control node may include an 802.11ad PCP, and thus may itself constitute an 802.11ad STA, and may determine one or more communications parameters governing communication between itself and other wireless nodes 104-n over wireless network 102. The embodiments are not limited in this regard.

In some embodiments, the wireless nodes 104-n may include one more wireless interfaces and/or components for wireless communication such as one or more transmitters, receivers, transceivers, chipsets, amplifiers, filters, control logic, network interface cards (NICs), antennas, antenna arrays, modules and so forth. Examples of an antenna may include, without limitation, an internal antenna, an omnidirectional antenna, a monopole antenna, a dipole antenna, an end fed antenna, a circularly polarized antenna, a microstrip antenna, a diversity antenna, a dual antenna, an antenna array, and so forth.

In various embodiments, the wireless nodes 104-n may include or form part of a wireless network 102 which may allow for peer-to-peer or ad hoc network communications. The wireless nodes 104-n may communicate directly with each other without necessarily needing a fixed device, such as a wireless access point. In some embodiment, for example, the wireless network 102 provides for contention-based medium access, such as carrier sense multiple access (CSMA) technique, often combined with a collision avoidance (CA) technique for wireless networks (CSMA/CA). The CSMA/CA technique is intended to provide fair and equal access to the wireless nodes 104-n, where each wireless node 104-n listens to the wireless shared medium before attempting to communicate.

However, when the wireless nodes 104-n are listening and waiting to communicate or the wireless shared medium, significant amounts of power may be consumed. Thus various embodiments may be directed to the wireless nodes 104-n employing various power saving techniques to dynamically schedule and align transactions of multiple interfering devices. More specifically and as will be discussed in more detail below, various embodiments may include dynamically changing an allocated period of time for a transaction sessions including shifting the start times for transaction sessions based on observed link occupancy. Thus by dynamically shifting transaction session start times and transaction periods based on link occupancy, the wireless nodes 104-n may more optimally enter and exit a power saving mode putting circuitry into a sleep or low power state between one or more intervals to communicate transaction between the wireless nodes 104-n.

Figure 1B:
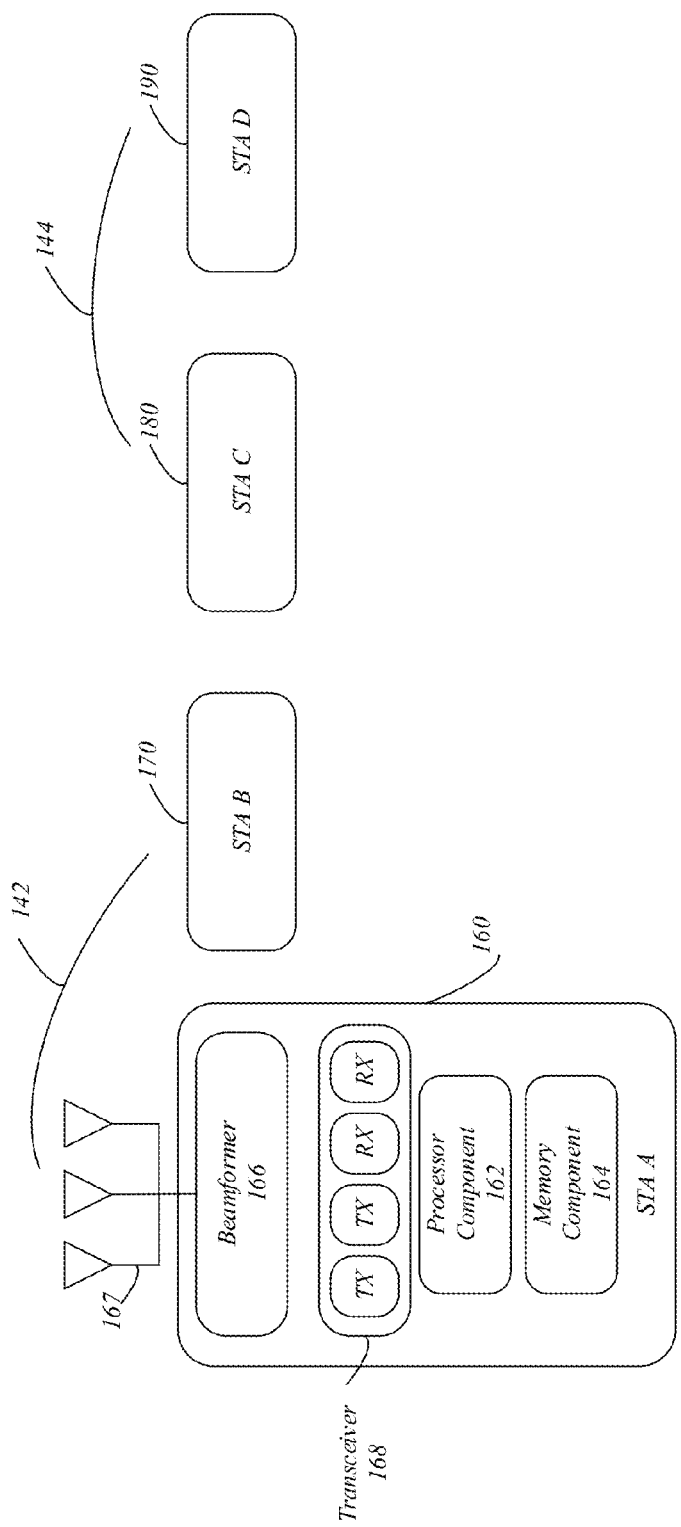
FIG. 1B illustrates an exemplary embodiment of a second communication system.

FIG. 1B illustrates a second exemplary embodiment of a communications system 150. In various embodiments, communications system 150 may be similar to and operate in a similar manner as communications system 100 previously discussed above. For example, communications network 150 may operate according to the WiGig/802.11ad Standards.

According to some exemplary embodiments, communications network 150, may include stations 160, 170, 180 and 190. Stations 160, 170, 180 and 190 are depicted as stations (STA) e.g., STA A, STA B, STA C, and STA D, respectively. In various embodiments stations 160, 170, 170 and 190 may be similar to or the same was any one of the wireless nodes 104-n discussed above with respect to FIG. 1A. Various embodiments are not limited in this manner.

Furthermore, according to some exemplary embodiments, a pair of stations, for example STA A 160 and STA B 170, and STA C 180 and STA D 190, may share a direct link of a privet basic service set (PBSS). For example, STA A 160 and STA B 170 may make up a first PBSS and may establish a direct link 142, and STA C 180 and STA D 190 may make up a second PBSS and may establish a direct link 144. It should be understood that the first and second PBSS may be neighboring networks which may not be able to transmit during a protected time or reserved time for communication established by one of the networks or stations within one of the PBSSs. In addition, the direct links 142 and 144 may share the same channel for communication, if desired.

As illustrated in FIG. 1B, STA A 160 may include a processor component 162, a memory component 164, a beamformer 166 and a transceiver 168. Further, the STA A 160 may include one or more antennas 167 coupled with the beamformer 166 and transceiver 168. The antennas may be comprised of one or more antenna elements to build phased array. The phased array may be set by the beamformer 166 in accordance with a beamforming protocol. The one or more antennas 167 may provide multiple-input-multiple-output (MIMO). However, various embodiments are not limited in this manner.

In various embodiments, processor component 162 may be any processor and may be capable of executing instructions to operate and/or control wireless communication devices according to embodiments (e.g., 60 GHz WPAN medium access controller (MAC)). The processor component 162 may be one or more of any type of computational element, such as but not limited to, a microprocessor, a processor, central processing unit, digital signal processing unit, dual core processor, mobile device processor, desktop processor, single core processor, a system-on-chip (SoC) device, complex instruction set computing (CISC) microprocessor, a reduced instruction set (RISC) microprocessor, a very long instruction word (VLIW) microprocessor, or any other type of processor or processing circuit on a single chip or integrated circuit. For example, the processor component 162 may include a graphical processing unit (GPU) for processing graphical and video information, in various embodiments. Although FIG. 1B only illustrates one processor component 162 various embodiments are not limited in this manner and the STA A 160 may include any number of processor components having any number of cores. The processor component 162 may be connected to and communicate with the other elements of the computing system via an interconnect, such as one or more buses, control lines, and data lines.

Memory component 164 may include one or more of random access memory (RAM), read-only memory (ROM), electrically erasable programmable read-only memory (EEPROM), flash memory, and hard disk memory. The memory component 162 is not limited to these memory components. For example, the memory component 162 may include a non-transitory computer-readable storage medium. These memory components can store data momentarily, temporarily, or permanently. The memory component 164 stores instructions and data for STA A 160. The memory component 164 may also store temporary variables or other intermediate information while the processor component 162 is executing instructions. In some embodiments, the memory component 164 is configured to store various types of data, including, without limitation, information and content for operating in an 802.11ad network.

Transceiver 168 may include a plurality of transmitters (TX) and a plurality of receivers (RX). Further, transceiver 168 may include circuitry to communicate information, data, transactions and so forth in accordance with one or more standards, such as the WiGig/802.11ad Standards. Further, antenna 167 may include a dipole antenna, an antenna array, an internal antenna, a one pole antenna, or the like. According to embodiments, STA B 170, STA C 180, and STA D 190 may include a similar or the same architecture as STA A 160 and the description of STA A 160 may be relevant to the to STA B 170, STA C 180, and STA D 190 as well.

According to embodiments, each pair of stations (e.g., STA A and STA B, STA C and STA D) may configure its antennas (e.g., antenna 138) for a direct link (e.g., direct links 142 and 144) establishment. A pair of stations may include a Source station and a Destination station, for example STA A 160 may be a Source station and STA B 170 may be a Destination station. In another example, STA D 190 may be a Source station and STA C 180 may be a Destination station. A pair of stations may have an agreed up transaction session start time for each transaction session and may have a time reservation for protected time to communicate during the transaction sessions by using Request To Send (RTS)/Clear To Send (CTS) handshaking.

In some embodiments, the time reservation may be allocated by the station that is operating as the Source station for communicating a transaction to the corresponding Destination station by communicating a RTS frame or a CTS frame including information in a duration field. The information in the duration field of a frame may include a time reservation value to reserve time for a transaction session for the Source station and the Destination station. The information in the duration field of the frame may also be used by interfering stations that want to communicate at the same time or during overlapping transaction sessions. For example, an interfering station may receive a frame during a listening period indicating the establishment of a transaction session between a Source station and a Destination station. The interfering station may use the information and time reservation value in the duration field of the frame to set a network allocation vector (NAV) timer (not shown).

By way of an example, STA A 160 may be a Source station, which may configure antennas 167 to establish a direct link 142 with a Destination station (e.g., STA B 170). The processor component 162 may configure antennas 167 to establish the direct link 142 by executing instructions stored in memory component 164, for example. The processor component 162 may also control transceiver 168 and beamformer 166 to set antenna's elements 167 according to a communication and antenna scheme. Although it should be understood that embodiments of the invention are not limited to this example.

Furthermore, when the direct link 142 is established, STA A 160 and STA B 170 may enter a listening mode during a listen period to determine if any other devices are communicating on the same channel and may interfere with a transaction. For example, STA C 180 and STA D 190 may have an established direct link 144 and may communicate a frame during the listen period for STA A 160 and STA B 170. STA A 160 may receive the frame and the processor component 162 may update a NAV timer with a time reservation value in a duration field of the frame. The value may reserve time for a transaction session for STA C and STA D to communicate within. The NAV timer may count down and may be locked at a value zero, for example. Once the NAV timer researches the value zero, STA A 160 and STA B 170 may communicate a transaction during a transaction session. In some instances, the processor component 162 may reset the NAV timer when a frame, such as a contention-free end (CF-End) frame, containing a medium access control (MAC) address that may be equal to the MAC address in the frame that asserts the NAV timer value including a truncation time. The processor component 162 may reset the NAV timer to zero when a frame is received indicating a truncation of a transaction session prior to the expiration of the original time reservation.

In some embodiments, the processor component 162 may not receive a frame having a time reservation value during the listen period and may begin a transaction session to communicate a transaction between STA A 160 and STA B 170 immediately after the listen period. The processor component 162 may reserve time for the transaction session by communicate a frame, such as an CTS frame or an RTS frame, prior to communicate information and data in a transaction. In this example, STA C 180 and/or STA D 190, whichever is in range, may receive the frame during a listening period and set their own NAV timers to adjust the start of the transaction session until STA A 160 and STA B 170 have completed communicated a transaction.

As similarly as discussed, STA A 160 and/or STA B 170 may communicate a frame indicating the truncation of their transaction session prior to expiration of the original time reservation. STA C 180, STA D 190, or both may receive the frame and may conduct a transaction during an adjusted transaction session. As will be discussed in more detail below, the stations may use the truncation time to adjust start times for subsequent transaction sessions.

Figure 2:
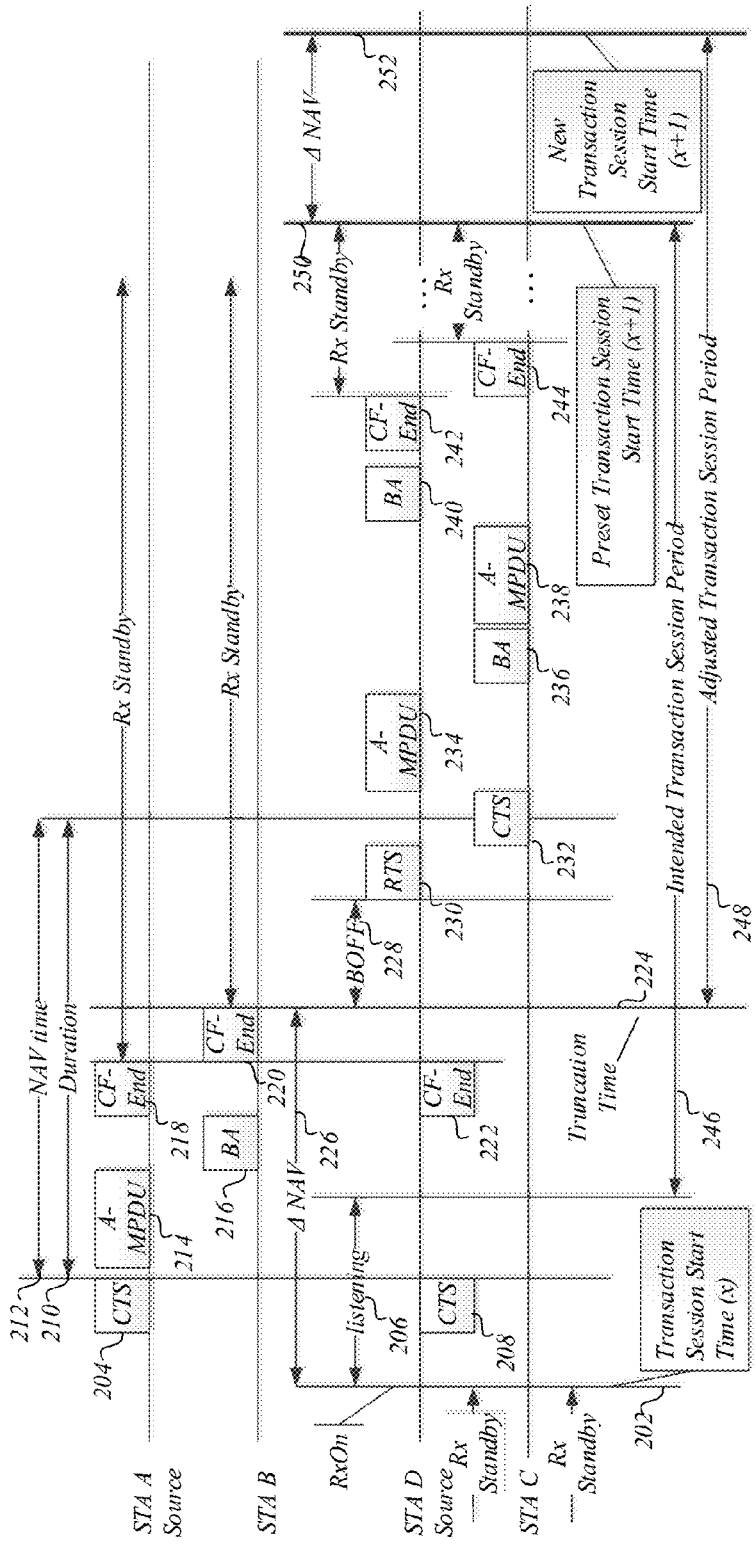
FIG. 2 illustrates an exemplary embodiment of a timing diagram.

FIG. 2 illustrates an exemplary embodiment of a timing diagram 200 for stations communicating during transaction sessions. In the exemplary timing diagram 200, two PBSSs may be established, a first PBSS includes STA A as a Source station and STA B as a Destination station and a second PBSS includes STA D as a Source station and STA C as a Destination station.

Timing diagram 200 illustrates the second PBSS including STA C and STA D exiting a standby mode where at least transceivers of the stations are in a low power or powered off state at line 202. The stations, STA C and STA D, may exit the standby mode at a determined transaction session start time and may enter a listening mode during a listen period 206 before communicating a transaction during a transaction session having a transaction session period 246. If STA C and STA D do not receive a frame indicating that a channel for a transaction is in use by other devices, STA C and STA D may communicate a transaction during the intended transaction session period 246. However, if STA C and/or STA D receive a frame reserving time to communicate on the channel, STA C and STA D may set NAV timers based on a time reservation value in the frame. The stations, STA C and STA D, will wait until the expiration of their NAV timers to conduct a transaction or until they receive another frame truncating the transaction session for the other devices.

The timing diagram 200 of FIG. 2 shows STA A communicating a CTS frame 204 having a value to reserve time or a duration 210 for a transaction session between STA A and STA B. STA C, STA D, or both may receive the CTS frame 204 communicated by STA A. In the illustrated embodiment, FIG. 2 only shows STA D receiving the sent CTS frame 204 as received CTS frame 208. STA D may use the value in the CTS frame 208 to set its NAV timer to a NAV time 212 and communicate the value to STA C for it to set a NAV timer to the NAV time 212. In this example, STA C may be out of range to receive the CTS frame 204, however, various embodiments are not limited in this manner and both stations may receive the CTS frame 204.

During the transaction session between STA A and STA B, STA A may communicate a transaction to STA B, the transaction may include information and data in any number of frames, such as an aggregate media access control protocol data unit (A-MPDU) 214 or any other type of unit that may include information and data. In response to receiving the A-MPDU 214, STA B may communicate a block acknowledgement (BA) 216. In various embodiments, STA A and STA B may communicate any amount of information during the duration 210 of the transaction session. In some embodiments, STA A or STA B may communicate a frame, such as a CF-End frame having a truncation time, to truncate the transaction session prior to the expiration of the NAV time 212 originally allocated for the transaction session. For example, FIG. 2 illustrates STA A communicating a CF-End frame 218 including a value to truncate the transaction session. The value may include zero time to immediately truncate the transaction session or non-zero time to initiate a CF-End frame transmission of the STA B. The time is of the size of the CF-End frame plus a short interframe space (SIFS). If the value of the duration field of the received CF-End frame is not equal to zero the STA B communicates a CF-End frame 220 as an acknowledgement to receiving the CF-End frame 218 from STA A.

In some embodiments, STA C, STA D, or both may receive at least one of the CF-End frames communicated by STA A and STA B. For example, timing diagram 200 illustrates STA D receiving the CF-End frame 222 communicated by STA A. As previously mentioned, the CF-End frame 222 may include a value, such as a truncation time 224, to truncate the transaction session between STA A and STA B. STA D may use the value to reset its NAV timer and shift transaction session start times for subsequent transaction sessions between STA D and STA C.

More specifically, STA D may use the value in the CF-End frame 222 to determine a delta network allocation vector (NAV) time 226 to use when shifting transaction session start time for at least one subsequent transaction session. The STA D may determine the delta NAV time 226 based on difference between end of the received CF-End frame (222) and a current transaction session start time (x) at line 202 plus value in CF-End frame (222), where x may be any positive integer. The delta NAV time 226 may be added to a subsequent preset or predetermined transaction session time (x+1) to determine a new transaction session time (x+1) for a subsequent transaction session between STA C and STA D. Various embodiments are not limited to this example, and a delta NAV time may be based on the difference between any frame having a value to truncate a transaction session and a transaction session start time for a different transaction session between different devices.

In addition, once the transaction session between STA A and STA B has ended, both STA A and STA B may enter a standby mode putting the stations into a power saving state. Further, STA D may receive the CF-End 222 and may start the communicating a transaction during the transaction session period 248 by first waiting for a random back off (BOFF) period 228 and then communicating a RTS frame 230 having a value to reserve time for the transaction session. STA C may receive the RTS frame 230 and respond with a CTS frame 232 also including a value to reserve time for the adjusted transaction session. In this example, STAs A and B will be in a standby mode and will not receive the RTS frame 230 and the CTS frame 232 send by the STAs D and C, respectively.

STA D may communicate information and data to STA C in one or more frames, such as A-MPDU 234 and STA C may response with BA 236. In some embodiments, STA C may also send information and data to STA D in one or more frames, such as A-MPDU 238 and STA D may respond with BA 240 during the adjusted transaction session. As similarly discussed above, STA C and STA D may communicate any amount of information and data in any number of frames during the adjusted transaction session within the reserved time period.

The stations, STA C and STA D, may wait for the reserved time period to expire or may send CF-End frames to truncate the adjusted transaction session and enter a standby mode of operation. For example and as illustrated in timing diagram 200, STA D communicates CF-End frame 242 having a value to truncate the transaction session and STA C communicates CF-End frame 244 in response to CF-End frame 242 and also including a value to truncate the transaction session. The STAs C and D may enter the standby mode of operation until the start of the next transaction session based on the new transaction session start time (x+1). In various embodiments, the intended transaction session period 246 may be the period between transaction sessions previously determined and negotiated by STAs C and D. The adjusted transaction session period 248 may be the period between transaction sessions based on the delta NAV time 226 determined by STA D.

As will be discussed in more detail below with respect to FIGS. 3A and 3B an adjustment may be made to a transaction session start time for each subsequent transaction session until there is no overlapping with interfering stations. Further, adjusting the transaction session start times may be advantageous for stations because they may remain in a standby mode of operation for longer periods of time conserving more power. Viewed differently, stations may spend less time in a fully active state while a NAV timer is counting down during transaction sessions of interfering devices waiting to communicate a transaction. Thus, adjusting the start times of transaction sessions based on a delta NAV time provides a more efficient scheduling scheme for transaction sessions.

Figure 3A:
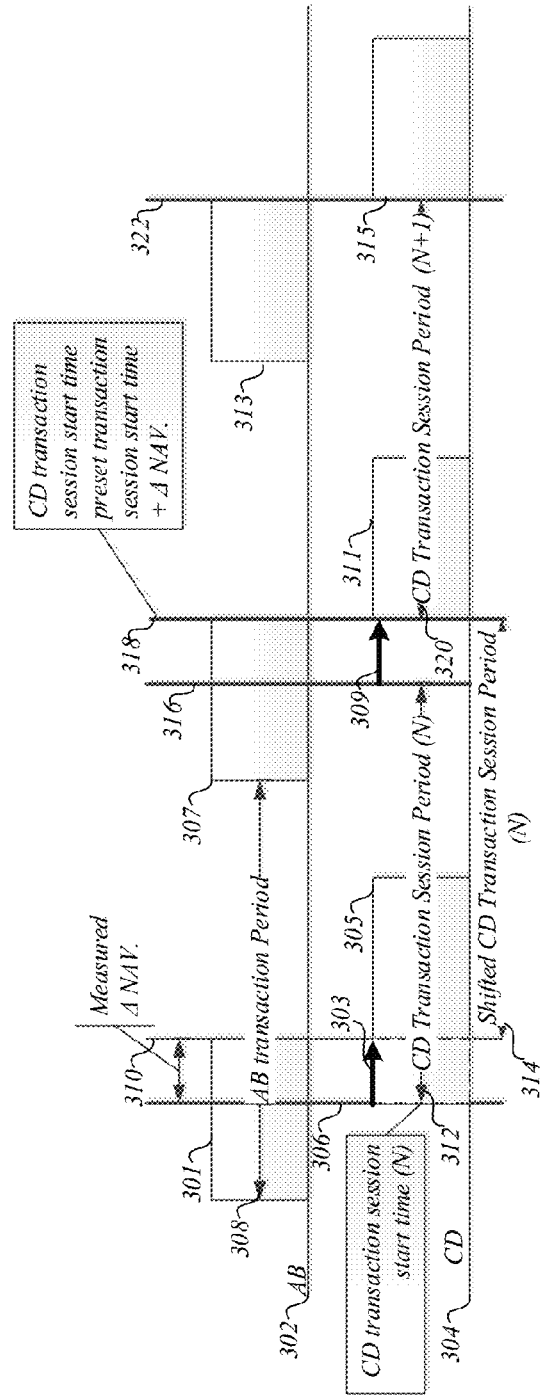
FIG. 3A illustrates an exemplary embodiment of a second timing diagram.

FIG. 3A illustrates an exemplary embodiment of a second timing diagram 300 of stations communicating during transaction sessions. More specifically, timing diagram 300 shows the station pair A and B communicating transactions 301, 307 and 313 on line 302 and the station pair C and D communicating transactions 305, 309 and 315 on line 304. Each of the transactions may be communicated during a transaction session and the time between each of the transactions may be a transaction session period. Furthermore, each transaction may include any number of communicated frames between the stations. For example, one or more frames, such as a CTS frame, an A-MPDU frame, a BA frame, a CF-end frame, and so forth may be communicated for a transaction.

Timing diagram 300 shows STAs C and D shifting a transaction session start time for a subsequent transaction based on a measured delta NAV time between a transaction session start time at line 306 and the end of the transaction 301 at line 310. As similarly discussed above with respect to FIG. 2, STAs C and D may determine the delta NAV time based on a difference between a transaction session start time for STAs C and D (line 306) and a truncation time of a transaction session between STAs A and B (line 310). The truncation may be indicated in a frame sent by STA A and/or STA B at the end of transaction 301. In this illustrated embodiment, STAs C and D only need to make one adjustment or shift to a transaction session start time and each subsequent transaction 309, 313 and so forth, will have the transaction session start times that do not overlap with interfering stations because STAs A and B and STAs C and D have the same transaction session period length. As will be discussed in more detail with respect to FIG. 3B, additional adjustments may need to be made if the stations do not have the same transaction session period length.

In timing diagram 300, the start of transaction 305 may be delayed until transaction 301 completes, as illustrated by arrow 303 showing a shift of the start of transaction 305. Moreover, the start of the next transaction session for STAs C and D to communicate subsequent transaction 311 may also be shifted or adjusted from line 316 to 318 as illustrated by arrow 309. The adjustment is based on the delta NAV time previously determined. More specifically, the delta NAV time may be added to a preset, determined, or predetermined transaction session start time for a subsequent transaction for STAs C and D to determine a new transaction session start time. As such, STAs C and D may remain in a standby mode longer while transaction 307 between STAs A and B is completed, for example. In timing diagram 300, no further adjustments or shifts are needed because the AB transaction session period 308 is equal to the CD transaction session period 312 and shifted transaction session period 314.

Figure 3B:
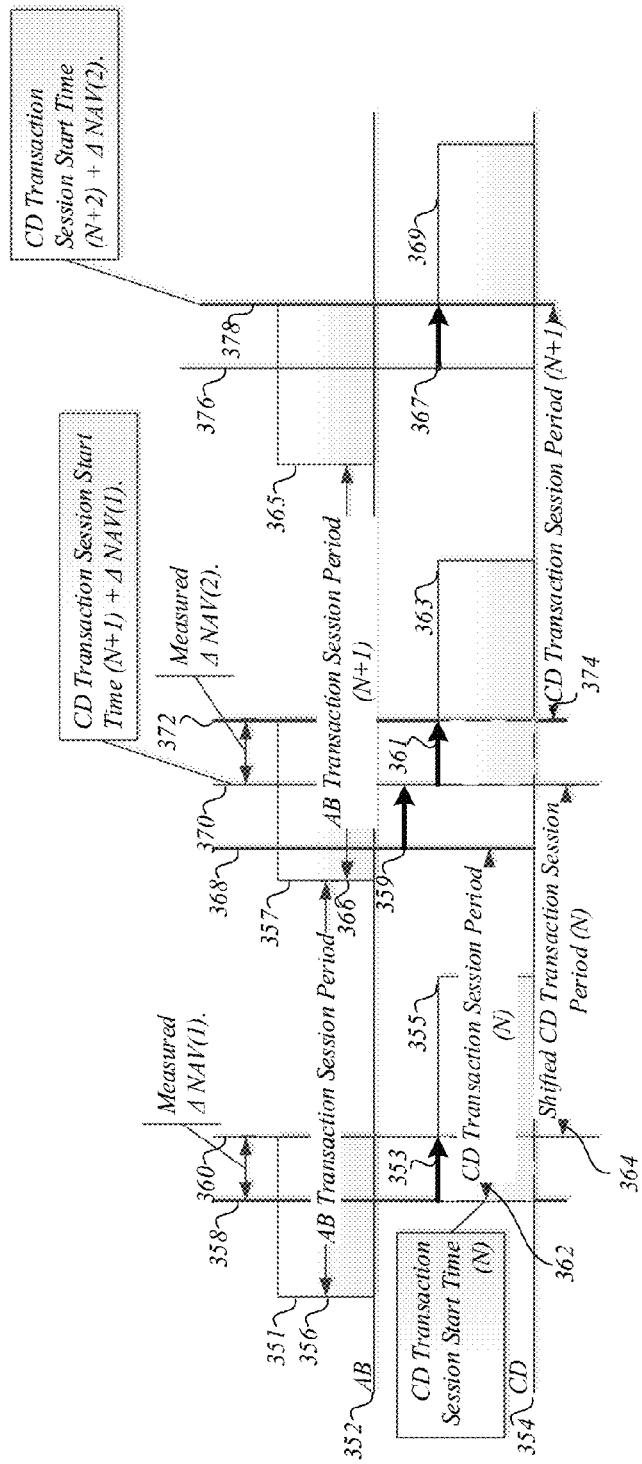
FIG. 3B illustrates an exemplary embodiment of a third timing diagram.

FIG. 3B illustrates an exemplary embodiment of a third timing diagram 350 of stations communicating during transaction sessions. More specifically, timing diagram 300 shows the station pair A and B communicating transactions 351, 357 and 365 on line 352 and the station pair C and D communicating transactions 355, 363 and 369 on line 304. In this exemplary embodiment, STAs A and B and STAs C and D have different transaction session period lengths. For example, the AB transaction session periods 356 and 366 are longer than the CD transaction session periods 362 and 374. In some instances, when the transaction session periods of different station pairs are not the same length, more than one adjustment or shift may be needed such that transaction session do not overlap.

As similarly discussed above, timing diagram 350 shows STA C and STA D transaction session starting at line 358 during transaction 351 communication between STAs A and B. STAs C and D must wait until transaction 351 is completed before transaction 355 may be communicated between STAs C and D as indicated by arrow 353. Once transaction 351 is complete, STAs C and D may communicate transaction 355.

However, while STAs C and D are waiting for transaction 351 to complete, significant processing power and battery life may be consumed. Thus, STAs C and D may determine a delta NAV time based on the difference between the transaction start time at line 358 and the end of the transaction 351 at line 360. The delta NAV time may be used to shift the transaction session start time for a subsequent transaction by adding the delta NAV time to a preset, determined or predetermined transaction session start time for a subsequent transaction. For example, delta NAV time (1) may be added to CD transaction session start time (N+1) to determine a new transaction session start time for STAs C and D, as illustrated by arrow 359.

In some embodiments, station pairs may have different transaction session period lengths. For example, FIG. 3B shows STAs A and B having a longer transaction session period length than STAs C and D. In this case, STAs C and D may exit the standby mode while transaction 357 is being communicated even after the CD transaction session start time for transaction 363 has been shifted as indicated by arrow 359. Thus, transaction 363 may be shifted again as indicated by arrow 361.

In addition, a delta NAV time (2) determination may be made by STAs C and D based on the difference between the new transaction session start time for the subsequent transaction 363 at line 370 and the end of transaction 357 between STAs A and B at line 372. The delta NAV time (2) may be added to the transaction session start time for subsequent transaction 369 to determine a new subsequent transaction session start time for the transaction 369 as indicated by arrow 367 and the CD Transition Session Period (374) can be extended by delta NAV. In this case, the next subsequent transaction between STAs C and D will likely not overlap and, as such, the STAs C and D may realize power and battery life savings. However, since the transaction session periods are not the same between STAs A and B and STAs C and D, additional shifts or adjustments may be required for subsequent transaction. Various embodiments are not limited in this manner.

Figure 4:
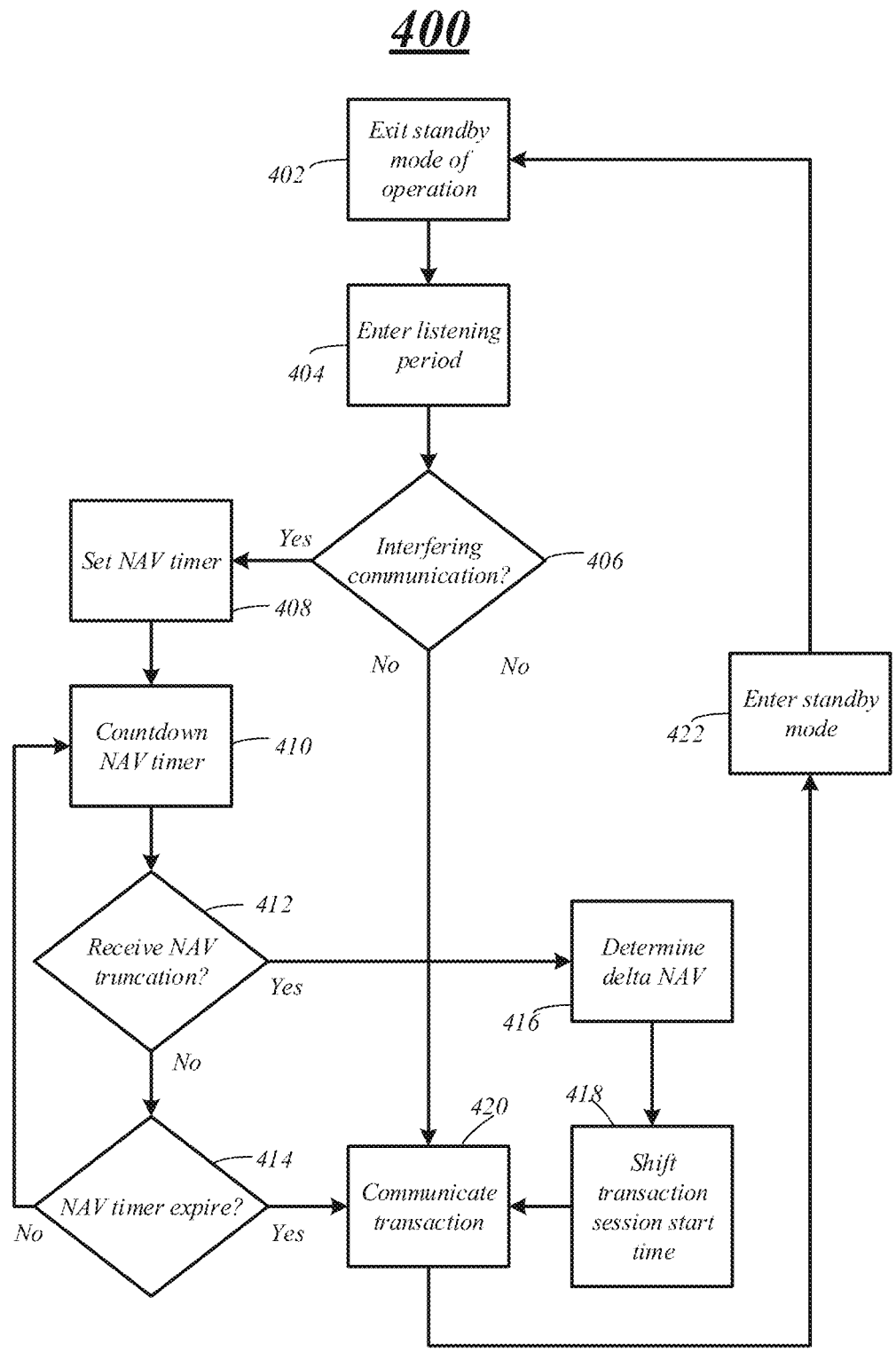
FIG. 4 illustrates an exemplary embodiment of a first logic flow diagram.

FIG. 4 illustrates an exemplary embodiment of a first logic flow diagram 400 to communicate transactions in a wireless network. Logic flow 400 may be performed by any type of computing system or computing device, such as a station and is discussed with reference to station 160 of FIG. 1B.

In various embodiments, a station 160 including its components may exit a standby mode of operation at block 402. In the standby mode of operation, one or more components of the station 160 may be in a power saving state. For example, transceivers 168 may be powered off and/or in a low power state where a minimal amount of power is being consumed. When the station 160 exits the standby mode of operation, transceivers 168 may be put into a full power state to communicate information with other devices.

At block 404, the station 160 may enter a listening period to determine whether other devices are communicating on the same channel or frequency that may interfere with a communicated transaction. Further, the station 160 and, in particular, the processor component 162 may determine whether other devices are communicated based on received information or transactions. For example, the stations 160, via transceiver 168, may receive a frame, such as a RTS frame or CTS frame, during the listening period indicating that other devices are communicating on a channel in which the station 160 desires to communicate on. In some embodiments, the station 160 may not receive information during the listen period and the channel may be free to communicate on. In this case, the station 160 may communicate a transaction with another device or station at block 420.

More specification, the station 160 may be coupled with another device or station in an ad-hoc or peer-to-peer arrangement, such as a PBSS and may communicate a transaction during a transaction session with the other station. The transaction may including communicating one or more frames having information and data with the other station.

If the station 160 including the processor component 162 determine that other devices are communicating on a desired channel during the listen period at block 406, the processor component 162 may wait to communicate the transaction and set a NAV timer at block 408. For example and in some embodiments, the station 160 may receive a RTS frame or a CTS frame including a time reservation to reserve time to conduct a transaction between the other devices. The station 160 may use the time reservation to set a NAV timer to countdown from. While the NAV timer is counting down, the station 160 may not communicate or conduct a transaction. The NAV timer may countdown to zero, and only after zero has been reached will the station 160 proceed with communicating a transaction with another station.

More specifically, the NAV timer may be decremented by a unit of one at block 410. Further, the station 160 may determine at block 412 whether a frame including truncation information including a truncation time has been received. For example, the station may receive a CF-End frame having a truncation time in a duration field to end the transaction between the other devices before the expiration of the NAV timer.

If the station 160 does receive a frame with truncation information at decision block 412, the station 160 may determine a delta NAV time to shift a transaction session start time for a subsequent transaction at block 416 and may shift a transaction session start time at block 418. More specifically, the station 160, and in particular, the processor component 162 may determine a difference between when the station 160 exited the standby mode of operation, i.e. a transaction session start time, and a truncation time. The difference or delta NAV time may be added to a predetermined and negotiated transaction session start time for a subsequent transaction.

The processor component 162 may use the delta NAV time to shift at least one transaction session start time for a subsequent transaction at block 418. For example, the station 160 may conduct transactions on a periodic basis based on a transaction session interval period and the processor component 162 may shift the predetermined or preset transaction session start time for the next transaction session by the delta NAV. Various embodiments are not limited in this manner.

If the station 160 does not receive a frame truncating the transaction between the other devices at decision block 412, the station 160 may determine whether the NAV timer has expired or reached zero at block 414. In some embodiments, the station 160 may determine if the NAV timer has expired prior to checking if it has received a frame having truncation information. Various embodiments are not limited in this manner and the blocks illustrated in FIG. 4 are not limited to a particular order.

If the NAV timer has not expired at block 414, blocks 410 through 414 may be repeated until the NAV timer reaches zero or a frame truncating the transaction is received. Once the NAV timer has expired or a frame truncating the transaction has been received, at block 420 the station 160 may communicate a transaction via processor component 162, transceiver 168, beamformer 166 and antenna array 167 with another device or station, as previously discussed. Once the transaction is complete, the station 160 may enter a standby mode until the next transaction session is to occur at block 422.

Figure 5:
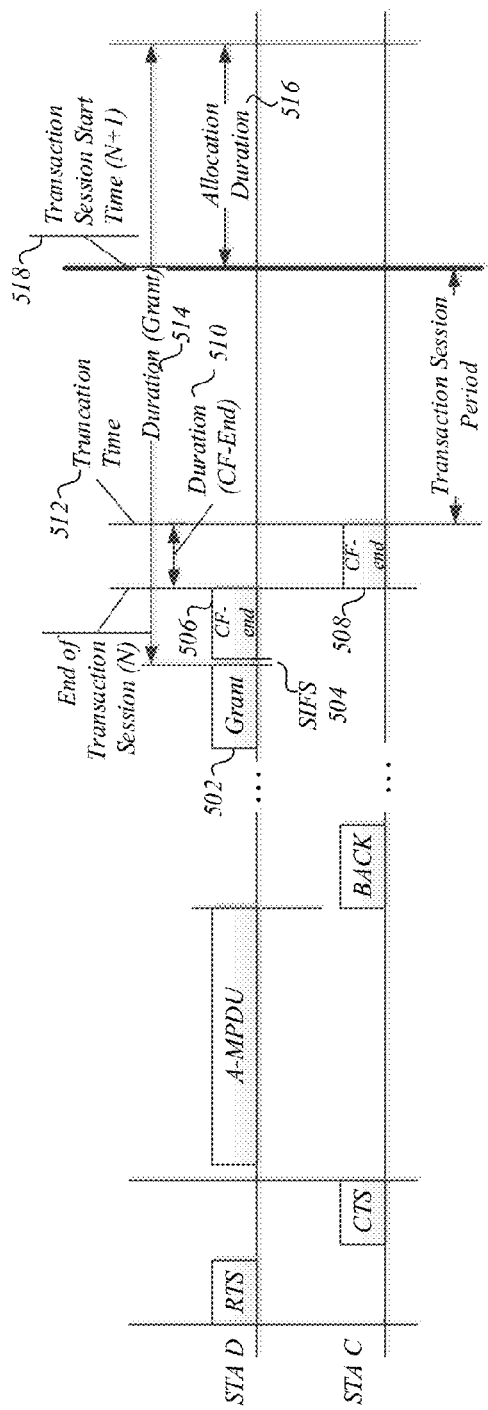
FIG. 5 illustrates an exemplary embodiment of a fourth timing diagram.

FIG. 5 illustrates an embodiment of fourth timing diagram 500 to communicate a transaction session start time. More specifically, FIG. 5 shows STA D and STA C during a transaction session where a transaction including an RTS frame, CTS frame, an A-MPDU frame and so forth are communicated between STA C and STA D. At the end of the transaction, STA C, STA D, or both may communicate a CF-End frame. As previously discussed, the CF-End frame may be used to communicate a truncation of a transaction session to the intended receiving device and other devices waiting to communicate on the same channel the transaction is occurring on. For example, timing diagram 500 shows STA D communicating CF-End frame 506 to STA C to indicate the end of a transaction session.

In some embodiments, the stations may communicate a transaction session start time for the next transaction session. The transaction session start time for the next transaction session may be a new transaction session start time based on a calculated delta NAV time, as previously discussed above and may be communicated between stations by communicating a Grant frame followed by a CF-End frame. As will be discussed in detail with respect to FIG. 6, a Grant frame may include a number of fields including a duration field having duration information and a dynamic allocation information field having allocation duration information. Further and as will be discussed below in FIG. 7, The CF-End frame may also having a number of fields including a duration field having duration information, e.g. a truncation time for the CF-End frame. The information in the Grant frame and the CF-End frame may be used to determine the transaction session start time for the next transaction session. More specifically, Equation 1 illustrates one exemplary embodiment for determining a transaction session start time based on the information in a Grant frame and a CF-End frame.

(1) transaction session start time=end of Grant frame receiving time+duration information (Grant frame)−Grant allocation duration information, where:

the duration information (Grant frame) is a time to communicate remaining Grant frame(s) if required+interframe spacing (IFS or SIFS) for each of the Grant frames+time to transmit one or two CF-End frames+SIFS if two CF-End frames are sent+the allocation duration; and the allocation duration information is a time allocated for a transaction session.

By way of example and as illustrated in FIG. 5, STA D may communicate Grant frame 502 during the transaction session followed by a CF-End frame 504 to truncate the transaction session. The Grant frame 502 may include duration information 514 in a duration field and allocation information 516 in an allocation duration field. As previously discussed, the duration information 514 may be an amount of time to communicate remaining Grant frame(s) if required, IFS(s) and/or SIFS(s) and the allocation duration 516. The allocation duration 516 may be the amount of time allocated to communicate a transaction during a transaction session.

The CF-End frame may include duration information 510 in a duration field which is an amount of time until the truncation time 512. In some instances, the duration information 510 may be zero if there is no time between the end of a CF-End frame and a truncation time. By using equation 1, both STA D and STA C may calculate the transaction session start time 518 for the next transaction based on the duration information 514, the allocation information 516, duration information 510, a time to communicate CF-End frame 506 and a SIFS time 504 using equation 1 above.

In some embodiments, stations may communicate a transaction session start time for the next transaction at the end of current transaction session. However, in the same or other embodiments, a transaction session start time may only be communicated when there shift or adjustment made based on a delta NAV calculation. Various embodiments are not limited in this manner.

Figure 6:
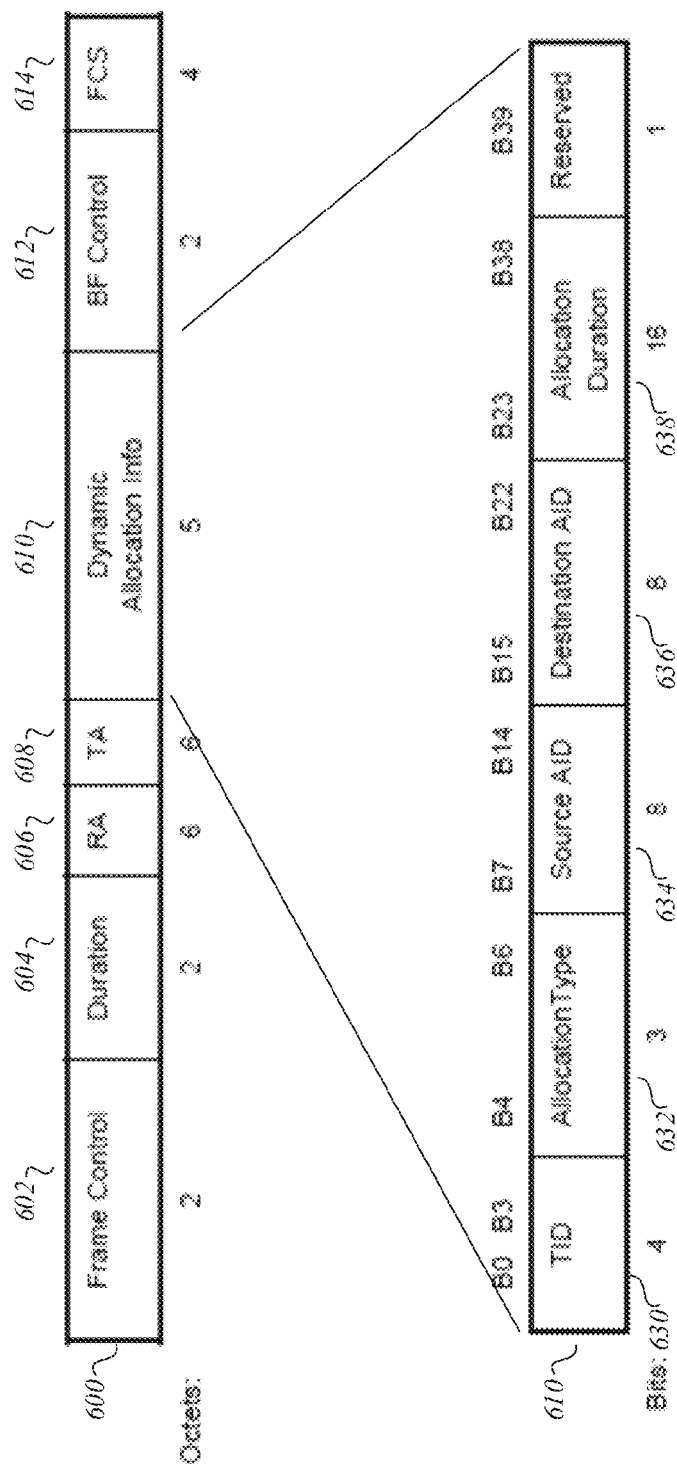
FIG. 6 illustrates an exemplary embodiment of a Grant frame.

FIG. 6 illustrates an exemplary embodiment of a Grant frame 600 that may be communicated during a transaction and include information to determine a transaction session start time. The Grant frame 600 may include a number of fields having information in accordance with one or more standards, such as IEEE 802.1 lad. For example, Grant frame 600 may include a frame control field 602, a duration field 604, a receive address (RA) field 606, a transmit address (TA) field 608, a dynamic allocation information field 610, a beamforming (BF) control field 612, and a frame check sequence (FCS) field 614.

The frame control field 602 may including control information for the grant frame 600, the duration field 604 may include a time to transmit any remaining Grant frame(s) if required, including required IFS's, and the allocation duration. The RA field 606 contains the medium access control (MAC) address for the station receiving the Grant frame 600 and the TA field 608 contains the MAC address of the station that is transmitting the Grant frame 600. The BF control field 612 contains a number of sub-fields having information for beamforming training, link adaptation, calibration control and feedback request information. The FCS field 614 contains information to conduct error detection for the Grant frame 600 by the receiving station.

The dynamic allocation information field 610 includes a number of sub-fields as illustrated in FIG. 6. More specifically, the dynamic allocation information field 610 may include a traffic identifier field 630 which includes information to identify the TC or TS for the allocation request or grant, an allocation type field 632 contains information to define the channel access mechanism during the allocation. The dynamic allocation information field 610 may also include a source AID field 634 containing information to identify the station that is the source of the allocation and a destination AID field 636 containing information to identify the station that is the destination of the allocation.

The allocation duration field 638 contains a requested duration for a transaction. In some embodiments, the requested duration may be in microseconds with possible range values from 0 to 32,767 for a transaction session allocation and 0 to 65,535 for a CBAP allocation. In some embodiments, a value of 0 in the allocation duration field 638 may indicate that a station can transmit one PDDU followed by any relevant acknowledgement plus one RTS/DMG CTS handshake.

Figure 7:
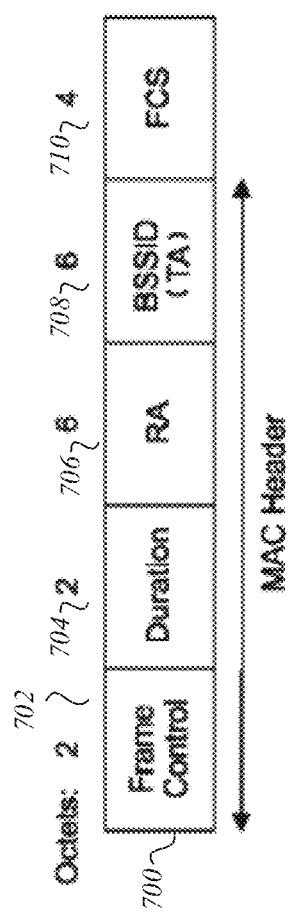
FIG. 7 illustrates an exemplary embodiment of a CF-End frame.

FIG. 7 illustrates an exemplary embodiment of a CF-End frame 700 in concordance with 802.11 that may be communicated during a transaction and include information to determine a transaction session start time. The CF-End frame 700 may include a number of fields having information in accordance with one or more standards, such as IEEE 802.11. For example, the CF-End frame 700 may include a control field 702, a duration field 704, a receive address (RA) field 706, a transmit address (TA) field 708 and a frame check sequence (FCS) field 710.

The control field 702 may include control information for the CF-End frame 700, the RA field 706 may contain the broadcast group address or a MAC of the intended receiving station, the TA field 708 may include the address of the station contained in an AP or MAC address of the station truncating the transaction session, and the FCS field 710 may include information to conduct error detection for the CF-End frame 700 by the receiving station. The duration field 704 may contain duration information indicating an amount of time until the truncation time or the time required to complete a CF-End truncation sequence, i.e. a truncation time. As previously discussed, the duration information may be used by a receiving device to determine a transaction session start time. Various embodiments are not limited in this manner.

Figure 8A:
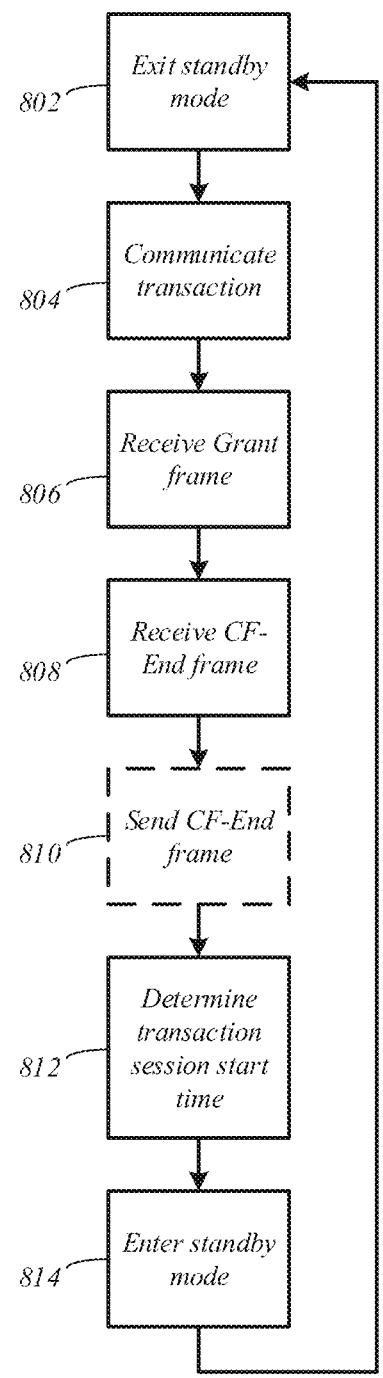
FIG. 8A illustrates an exemplary embodiment of a second logic flow diagram.

FIG. 8A illustrates an exemplary embodiment of a logic flow 800 for performing a transaction session and communicating a transaction session start time. Logic flow 800 may be performed by any type of computing system, computing device, station and so forth. For example, logic flow 800 may be performed by a station conducting a transaction session with another station that initiated the transaction session, such as STA C in FIGS. 1B, 2 and 5.

At block 802 a station may exit a standby mode of operation where one or more components are in a power saving state to conserve battery life and power. In some embodiments, the station may exit the standby mode at a transaction session start time that may be based on a negotiated time by the stations and may be preset, predetermined or determined. In some embodiments, the transactions session start time may have been previously communicated to the station via a Grant frame followed by a CF-End frame and may take into account a delta NAV shift based on other devices communicating on a same channel.

The station may communicate a transaction during a transaction session at block 804. As previously discussed, the transaction may include the sending and receiving of a number of frames, such as an RTS frame, a CTS frame, an A-MPDU frame, and so forth. In some embodiments, the station may communicate the transaction after a listen period and a determination has been made that no other devices are interfering on a same channel for communication.

At block 806, the station may receive a Grant frame having information including duration information in a duration field and allocation duration information in a dynamic allocation information field from the station that initiated the transaction session. Further and at block 808, the station may receive a CF-End frame having information including duration information, i.e. a truncation time in a duration field. In some embodiments, the CF-End frame may be the next frame received after the Grant frame without any intervening frames. Further, the CF-End frame may be received after an IFS or a short interframe space (SIFS). Various embodiments are not limited in this manner.

In some embodiments, the station may send a CF-End frame at optional block 810 if it is allowed by the peer STA. The CF-End frame sent by the station and may also include duration information equal to zero, i.e. a truncation time in a duration field. However, in various embodiments, the station may not send a CF-End frame at block 810 and the logic flow 800 may proceed to determining a transaction session start time at block 812. The station may determine the transaction session start time for the next transaction based on the information in the Grant frame received from the other station.

At block 814, the station may enter a standby mode operation until the next transaction session is to occur. More specifically, the station may enter a standby mode until the transaction session start time determined at block 812. In various embodiments, blocks 802 through 814 may repeat any number of times to conduct one or more transaction during transaction sessions and may occur on a periodic or semi-period basis having a transaction session period.

Figure 8B:
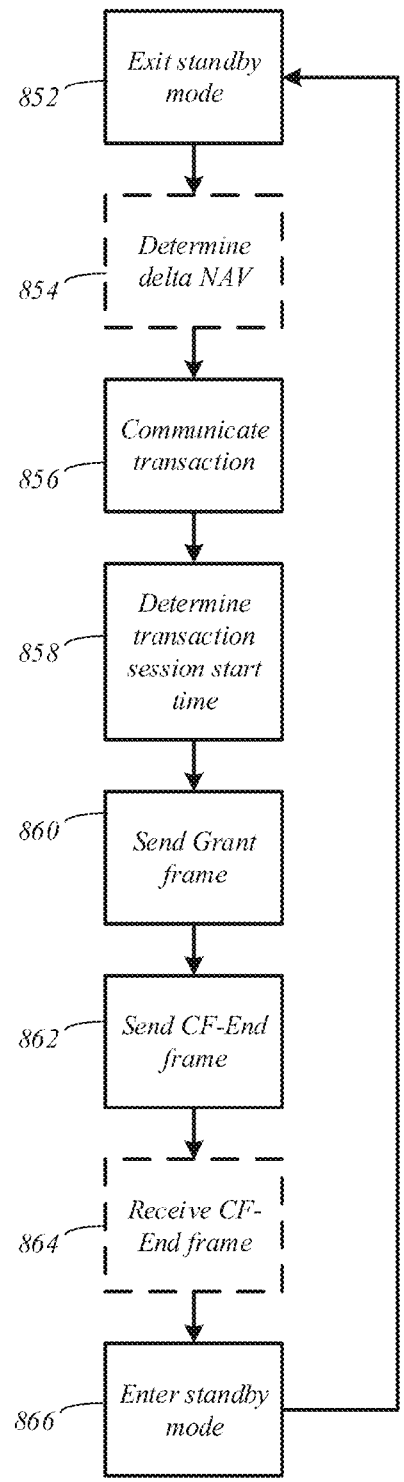
FIG. 8B illustrates an exemplary embodiment of a third logic flow diagram.

FIG. 8B illustrates an exemplary embodiment of a logic flow 850 for performing a transaction session and communicating a transaction session start time. Logic flow 850 may be performed by any type of computing system, computing device, station and so forth. For example, logic flow 850 may be performed by a station initiating and conducting a transaction session with another station, such as STA D in FIGS. 1B, 2 and 5.

At block 852 a station may exit a standby mode of operation where one or more components are in a power saving state to conserve battery life and power. In some embodiments, the station may exit the standby mode at a transaction session start time that may be based on negotiated time by the stations. In some embodiments, the transactions session start time may be been previously communicated to the station via a Grant frame followed by a CF-End frame and may take into account a delta NAV time shift based on other devices communicating on a same channel.

In some embodiments, the station may enter a listening period and determine if other devices are communicating on a same and at optional block 854, the station may determine a delta NAV time to shift start times for one or more subsequent transaction sessions. If no other devices are communicating on the same channel in which the station is to communicate on, the station will not determine a delta NAV at optional block 854. At block 856, the station may communicate a transaction during a transaction session with another station. During the transaction, the stations may communicate one or more frames having information.

At block 858, the station may determine a transaction session start time for the next transaction and transaction session. If a delta NAV was determined at block 854, the station may determine a transaction start session start time, by shifting a predetermined, preset, or determined transaction session start time for a subsequent transaction session by the delta NAV time or to use adjusted Transaction Session Period. The station may communicate the transaction session start time, by communicating a Grant frame at block 860 and a CF-End frame at block 862. The Grant frame may include duration information and allocation duration information and the CF-End frame may include duration information to allow CF-End transmission by the initiated station. The receiving station may use this information to determine the transaction session start time, as previously discussed.

If the receiving station sends a CF-End frame, the station may receive a CF-End frame at optional block 864. The station may enter a standby mode at the end of the transaction at block 866. In various embodiments, the station may remain in the standby mode of operation until the transaction session start time when another transaction session is to occur. Blocks 852 through 866 may be repeated any number of times and various embodiments are not limited in this manner.

FIG. 9 illustrates one embodiment of a logic flow 900. The logic flow 900 may be representative of some or all of the operations executed by one or more embodiments described herein. For example, the logic flow 900 may illustrate operations performed by systems 100, 150, stations 160, 170, 180 and 190, and so forth. In the illustrated embodiment shown in FIG. 9, the logic flow 900 may include initiating a transaction session at a transaction session start time to communicate a transaction between a first device and a second device at block 905. The transaction session start time may be predetermined or negotiated between the first device and the second device to communicate a transaction. Further, the first device and second device may conduct a number of transaction session to communicate transaction on a periodic, semi-periodic, or non-period basis. For example, the time between two transaction session start times may be a transaction session period.

Further, the first device and the second device may communicate information in one or more frames during the transaction session as a transaction. For example, the first device and second device may communicate frames, such as an RTS frame, a CTS frame, MPDU frame, an A-MPDU, a CF-End frame, Grant frame, or any other type of frame during the transaction session.

In some embodiments, the first device and second device may enter a listen period upon the initiation of the transaction to determine whether one or more other devices are communicating on a same channel in which the transaction is to occur on. Logic flow 900 may also include receiving a first frame comprising information indicating an occurrence of another transaction session between other devices and a time reservation for the other transaction session at block 910. For example, the first device or second device may receive a CTS frame or a RTS frame having time information to receive a time period for other devices to conduct transaction to and to prevent the first device and second device from communicating during this time period as not to cause interference.

The first device and the second device may set a NAV timer upon receiving the first frame based on the time reservation. The NAV timer may countdown from a time based on the time reservation until it reaches zero. However, various embodiments are not limited in this manner and the NAV timer may count up from zero until the time reservation is reached. While the NAV timer is counting, the first device and the second device may not communicate frames.

In some instances, the time reservation may be truncated. More specifically, the logic flow 900 may include receiving a second frame comprising second information indicating a truncation of the other transaction session at a truncation time and before an expiration of the time reservation at block 915. One or both of the other devices may determine that the transaction has completed before the expiration of the time reservation and may indicate to the first and/or second device that they are free to communicate on the channel by communicate a frame having a truncation time. For example, one or both of the other devices may communicate a CF-End frame having a truncation time indicating a time to truncation the other transaction session. In some embodiments, the truncation time may be zero immediately release the channel for communication. However, various embodiments are not limited in this manner and the truncation time may be any time in the future, in microseconds for example, indicating when the transaction session is complete.

For future transaction sessions, the first and second device may adjust or shift a transaction session start time such that they may spend more time in a standby mode of operation and a low power state. When the first and second devices are waiting for the other devices to finish their transaction session a significant amount of power may be used. Thus, battery life extended by shifting or adjusting subsequent transaction session start time. In some embodiments, logic flow 900 may include shifting a subsequent transaction session start time for at least one subsequent transaction session between the first device and the second device based on a difference between the transaction session start time and the truncation time at block 920. In particular, the difference between the transaction session start time and the truncation time may be a delta NAV time that may be added to a predetermined or negotiated subsequent transaction session star time causing the first and second devices to remain in the standby mode longer. The Transaction Session Period may be adjusted to be kept even no delta NAV is observed in the current transaction.

Figure 10:
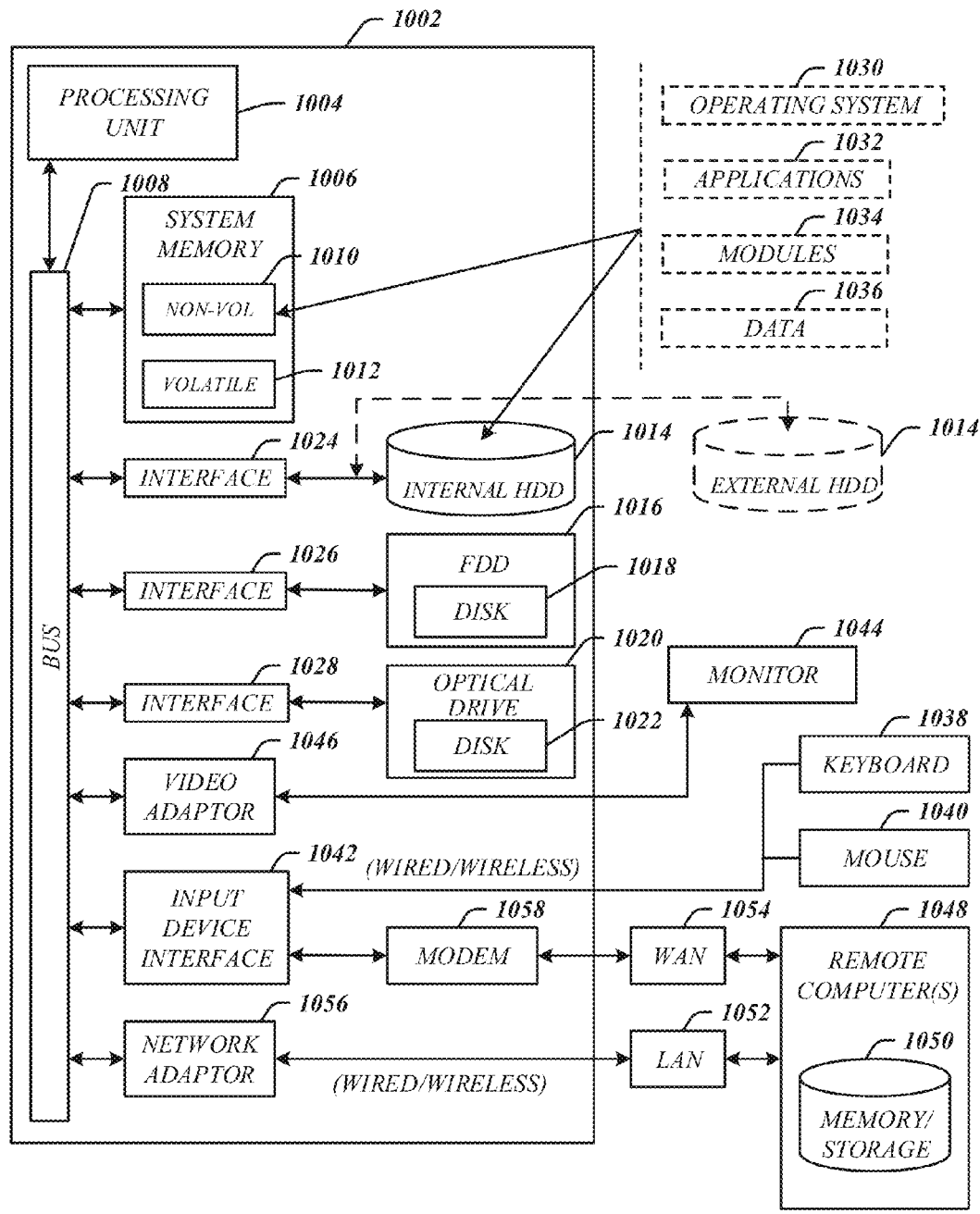
FIG. 10 illustrates an exemplary embodiment of a computing architecture.

FIG. 10 illustrates an embodiment of an exemplary computing architecture 1000 suitable for implementing various embodiments as previously described. In one embodiment, the computing architecture 1000 may include or be implemented as part of or system 100, 150 or any of the devices and stations discussed above.

As used in this application, the terms "system" and "component" are intended to refer to a computer-related entity, either hardware, a combination of hardware and software, software, or software in execution, examples of which are provided by the exemplary computing architecture 1000. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1000 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1000.

As shown in FIG. 9, the computing architecture 1000 includes a processing unit 1004, a system memory 1006 and a system bus 1008. The processing unit 1004 can be any of various commercially available processors, such as those described with reference to the processor component 102 shown in FIG. 1.

The system bus 1008 provides an interface for system components including, but not limited to, the system memory 1006 to the processing unit 1004. The system bus 1008 can be any of several types of bus structure that may further interconnect to a memory bus (with or without a memory controller), a peripheral bus, and a local bus using any of a variety of commercially available bus architectures. Interface adapters may connect to the system bus 1008 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1000 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1006 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 9, the system memory 1006 can include non-volatile memory 1010 and/or volatile memory 1012. A basic input/output system (BIOS) can be stored in the non-volatile memory 1010.

The computer 1002 may include various types of computer-readable storage media in the form of one or more lower speed memory units, including an internal (or external) hard disk drive (HDD) 1014, a magnetic floppy disk drive (FDD) 1016 to read from or write to a removable magnetic disk 1018, and an optical disk drive 1020 to read from or write to a removable optical disk 1022 (e.g., a CD-ROM or DVD). The HDD 1014, FDD 1016 and optical disk drive 1020 can be connected to the system bus 1008 by a HDD interface 1024, an FDD interface 1026 and an optical drive interface 1028, respectively. The HDD interface 1024 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1010, 1012, including an operating system 1030, one or more application programs 1032, other program modules 1034, and program data 1036. In one embodiment, the one or more application programs 1032, other program modules 1034, and program data 1036 can include, for example, the various applications and/or components of the system 105.

A user can enter commands and information into the computer 1002 through one or more wire/wireless input devices, for example, a keyboard 1038 and a pointing device, such as a mouse 1040. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1004 through an input device interface 1042 that is coupled to the system bus 1008, but can be connected by other interfaces such as a parallel port, IEEE 1394 serial port, a game port, a USB port, an IR interface, and so forth.

A monitor 1044 or other type of display device is also connected to the system bus 1008 via an interface, such as a video adaptor 1046. The monitor 1044 may be internal or external to the computer 1002. In addition to the monitor 1044, a computer typically includes other peripheral output devices, such as speakers, printers, and so forth.

The computer 1002 may operate in a networked environment using logical connections via wire and/or wireless communications to one or more remote computers, such as a remote computer 1048. The remote computer 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wire/wireless connectivity to a local area network (LAN) 1052 and/or larger networks, for example, a wide area network (WAN) 1054. Such LAN and WAN networking environments are commonplace in offices and companies, and facilitate enterprise-wide computer networks, such as intranets, all of which may connect to a global communications network, for example, the Internet.

When used in a LAN networking environment, the computer 1002 is connected to the LAN 1052 through a wire and/or wireless communication network interface or adaptor 1056. The adaptor 1056 can facilitate wire and/or wireless communications to the LAN 1052, which may also include a wireless access point disposed thereon for communicating with the wireless functionality of the adaptor 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wire and/or wireless device, connects to the system bus 1008 via the input device interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with wire and wireless devices or entities using the IEEE 802 family of standards, such as wireless devices operatively disposed in wireless communication (e.g., IEEE 802.11 over-the-air modulation techniques). This includes at least WiFi (or Wireless Fidelity), WiMax, and Bluetooth™ wireless technologies, 3G, 4G, LTE wireless technologies, among others. Thus, the communication can be a predefined structure as with a conventional network or simply an ad hoc communication between at least two devices. WiFi networks use radio technologies called IEEE 802.11x (a, b, g, n, etc.) to provide secure, reliable, fast wireless connectivity. A WiFi network can be used to connect computers to each other, to the Internet, and to wire networks (which use IEEE 802.3-related media and functions).

The various elements of the computing device and stations as previously described with reference to FIGS. 1-10 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The detailed disclosure now turns to providing examples that pertain to further embodiments. Examples one through forty (1-40) provided below are intended to be exemplary and non-limiting.

In a first example, a system, a station, or an apparatus may include logic, a portion of which is implemented in hardware, the logic to initiate a first transaction session with a device at a transaction session start time, receive information comprising an indication of a second transaction session with another device, a time reservation for the second transaction session and a truncation event of the second transaction session at a truncation time before expiration of the time reservation, the logic to shift a subsequent transaction session start time for a subsequent transaction session with the device based on a difference between the transaction session start time and the truncation time.

In a second example and in furtherance of the first example, a system, a station or apparatus may include logic to cause the apparatus to exit a standby mode of operation at the transaction session start time where at least a transceiver of the apparatus is in a power saving state.

In a third example and in furtherance of any of the previous examples, a system, a station or apparatus may include logic to determine a delta network allocation vector time equaling the difference between the transaction session start time and the truncation time and add the delta network allocation vector time to a preset transaction session start time to shift the subsequent transaction session start time.

In a fourth example and in furtherance of any of the previous examples, a system, a station or apparatus may include logic to determine whether subsequent transaction sessions for the apparatus and the device overlap subsequent transaction sessions for other devices after the subsequent transaction session start time has been shifted and shift subsequent transaction session start times until the transaction sessions for the apparatus and the device do not overlap transaction sessions for the other devices.

In a fifth example and in furtherance of any of the previous examples, a system, a station or apparatus may include logic to communicate a transaction start time using a grant frame and a contention-free end (CF-End) frame, the grant frame comprising a duration field having duration information and a dynamic allocation information field having allocation duration information, the CF-End frame comprising a duration field having duration information for the CF-End frame.

In a sixth example and in furtherance of any of the previous examples, a system, a station or apparatus may include a memory, a transceiver coupled with at least one antenna, and a processor component to initiate a transaction session at a transaction session start time to communicate a transaction via the transceiver between the apparatus and a device, the transceiver to receive a first frame comprising information indicating an occurrence of another transaction session between other devices and a time reservation to reserve time for the other transaction session and to receive a second frame comprising second information indicating a truncation of the other transaction session at a truncation time and before an expiration of the time reservation, and the processor component to shift a subsequent transaction session start time for at least one subsequent transaction session between the apparatus and the device based on a difference between the transaction session start time and the truncation time.

In a seventh example and in furtherance of any of the previous examples, a system, a station or apparatus may include the transceiver to receive the first frame during a listening period of the transaction session to determine if other devices are communicating on a channel to communicate the transaction during the transaction session.

In an eighth example and in furtherance of any of the previous examples, a system, a station or apparatus may include the processor component to cause at least the transceiver to exit a standby mode of operation at the transaction session start time where at least the transceiver of the apparatus is in a power saving state.

In a ninth example and in furtherance of any of the previous examples, a system, a station or apparatus may include the first frame comprising a clear-to-send (CTS) frame or a request-to-send (RTS) frame communicated by one of the other devices.

In a tenth example and in furtherance of any of the previous examples, a system, a station or apparatus may include the second frame comprising a contention-free end (CF-End) frame communicated by one of the other devices.

In an eleventh example and in furtherance of any of the previous examples, a system, a station or apparatus may include the processor component to determine a delta network allocation vector time equaling the difference between the transaction session start time and the truncation time and add the delta network allocation vector time to a determined transaction session start time for the subsequent transaction session to shift the subsequent transaction session start time.

In a twelfth example and in furtherance of any of the previous examples, a system, a station or apparatus may include the processor component to determine whether subsequent transaction sessions for the apparatus and the device overlap subsequent transaction sessions for other devices after the subsequent transaction session start time has been shifted and to shift subsequent transaction session start times until the transaction sessions for the apparatus and the device do not overlap transaction sessions for other devices.

In a thirteenth example and in furtherance of any of the previous examples, a system, a station or apparatus may include the processor component to communicate, via the transceiver, a transaction start time using a grant frame and a contention-free end (CF-End) frame, the grant frame comprising a duration field having duration information and a dynamic allocation information field having allocation duration information, the CF-End frame comprising a duration field having duration information for the CF-End frame.

In a fourteenth example and in furtherance of any of the previous examples, a system, a station or apparatus may include a housing comprising the memory, the processor component, the transceiver, and further comprising a display; an input/output (I/O) device.

In a fifteenth example and in furtherance of any of the previous examples, a method may include initiating, by processing circuitry, a transaction session at a transaction session start time to communicate a transaction between a first device and a second device, receiving, by the processing circuitry, a first frame comprising information indicating an occurrence of another transaction session between other devices and a time reservation to reserve time for the other transaction session, receiving, by the processing circuitry, a second frame comprising second information indicating a truncation of the other transaction session at a truncation time and before an expiration of the time reservation, shifting, by the processing circuitry, a subsequent transaction session start time for at least one subsequent transaction session between the first device and the second device based on a difference between the transaction session start time and the truncation time.

In a sixteenth example and in furtherance of any of the previous examples, a method may include the first frame received during a listening period of the transaction session to determine if other devices are communicating on a channel to communicate the transaction during the transaction session.

In a seventeenth example and in furtherance of any of the previous examples, a method may include exiting, by the processing circuitry, a standby mode of operation at the transaction session start time by the first device and the second device where at least a transceiver of the first device or the second device is in a power saving state.

In an eighteenth example and in furtherance of any of the previous examples, a method may include the first frame comprising a clear-to-send (CTS) frame or a request-to-send (RTS) frame communicated by one of the other devices.

In a nineteenth example and in furtherance of any of the previous examples, a method may include the second frame comprising a contention-free end (CF-End) frame communicated by one of the other devices.

In a twentieth example and in furtherance of any of the previous examples, a method may include determining a delta network allocation vector time equaling the difference between the transaction session start time and the truncation time and adding the delta network allocation vector time to a determined transaction session start time for the subsequent transaction session to shift the subsequent transaction session start time.

In a twenty-first example and in furtherance of any of the previous examples, a method may include determining, by the processing circuitry, whether subsequent transaction sessions for the first device and the second device overlap subsequent transaction sessions for other devices after the subsequent transaction session start time has been shifted and shifting, by the processing circuitry, subsequent transaction session start times until the transaction sessions for the first device and the second device do not overlap transaction session for other devices.

In a twenty-second example and in furtherance of any of the previous examples, a method may include communicating, by the processing circuitry, a transaction start time using a grant frame and a contention-free end (CF-End) frame, the grant frame comprising a duration field having duration information and a dynamic allocation information field having allocation duration information, the CF-End frame comprising a duration field having duration information for the CF-End frame.

In a twenty-third example and in furtherance of any of the previous examples, an article comprising a computer-readable storage medium containing a plurality of instructions that when executed enable a computing device to initiate a transaction session at a transaction session start time to communicate a transaction between a first device and a second device, receive a first frame comprising information indicating an occurrence of another transaction session between other devices and a time reservation to reserve time for the other transaction session, receive a second frame comprising second information indicating a truncation of the other transaction session at a truncation time and before an expiration of the time reservation and shift a subsequent transaction session start time for at least one subsequent transaction session between the first device and the second device based on a difference between the transaction session start time and the truncation time.

In a twenty-fourth example and in furtherance of any of the previous examples, an article comprising a computer-readable storage medium containing a plurality of instructions that when executed enable a computing device to the first frame received during a listening period of the transaction session to determine if other devices are communicating on a channel to communicate the transaction during the transaction session.

In a twenty-fifth example and in furtherance of any of the previous examples, an article comprising a computer-readable storage medium containing a plurality of instructions that when executed enable a computing device to exit a standby mode of operation at the transaction session start time by the first device and the second device where at least a transceiver of the first device or the second device is in a power saving state.

In a twenty-sixth example and in furtherance of any of the previous examples, an article comprising the first frame comprising a clear-to-send (CTS) frame or a request-to-send (RTS) frame communicated by one of the other devices.

In a twenty-seventh example and in furtherance of any of the previous examples, an article comprising the second frame comprising a contention-free end (CF-End) frame communicated by one of the other devices.

In a twenty-eighth example and in furtherance of any of the previous examples, an article comprising a computer-readable storage medium containing a plurality of instructions that when executed enable a computing device to determine a delta network allocation vector time equaling the difference between the transaction session start time and the truncation time and add the delta network allocation vector time to a determined transaction session start time for at least one subsequent transaction session to shift a transaction session start time for the at least one subsequent transaction session.

In a twenty-ninth example and in furtherance of any of the previous examples, an article comprising a computer-readable storage medium containing a plurality of instructions that when executed enable a computing device to determine whether subsequent transaction sessions for the first device and the second device overlap subsequent transaction sessions for the other devices after the subsequent transaction session start time has been shifted and shift subsequent transaction session start times until the transaction sessions for the first device and the second device do not overlap transaction session for the other devices.

In a thirtieth example and in furtherance of any of the previous examples, an article comprising a computer-readable storage medium containing a plurality of instructions that when executed enable a computing device to communicate a transaction start time using a grant frame and a contention-free end (CF-End) frame, the grant frame comprising a duration field having duration information and a dynamic allocation information field having allocation duration information, the CF-End frame comprising a duration field having duration information for the CF-End frame.

In a thirty-first example and in furtherance of any of the previous examples, a method may include initiating a first transaction session with a device at a transaction session start time, receiving information comprising an indication of a second transaction session with another device, and a time reservation for the second transaction session, receiving a truncation event of the second transaction session at a truncation time before expiration of the time reservation and shifting a subsequent transaction session start time for a subsequent transaction session with the device based on a difference between the transaction session start time and the truncation time.

In a thirty-second example and in furtherance of any of the previous examples, a method may include exiting a standby mode of operation at the transaction session start time where at least a transceiver is in a power saving state.

In a thirty-third example and in furtherance of any of the previous examples, a method may include determining a delta network allocation vector time equaling the difference between the transaction session start time and the truncation time and adding the delta network allocation vector time to a preset transaction session start time to shift the subsequent transaction session start time.

In a thirty-fourth example and in furtherance of any of the previous examples, a method may include determining whether subsequent transaction sessions for the apparatus and the device overlap subsequent transaction sessions for other devices after the subsequent transaction session start time has been shifted and shift subsequent transaction session start times until the transaction sessions for the apparatus and the device do not overlap transaction sessions for the other devices.

In a thirty-fifth example and in furtherance of any of the previous examples, a method may include communicating a transaction start time using a grant frame and a contention-free end (CF-End) frame, the grant frame comprising a duration field having duration information and a dynamic allocation information field having allocation duration information, the CF-End frame comprising a duration field having duration information for the CF-End frame.

In a thirty-sixth example and in furtherance of any of the previous examples, an article comprising a computer-readable storage medium containing a plurality of instructions that when executed enable a computing device to initiate a first transaction session with a device at a transaction session start time, receive information comprising an indication of a second transaction session with another device, and a time reservation for the second transaction session, receive a truncation event of the second transaction session at a truncation time before expiration of the time reservation and shift a subsequent transaction session start time for a subsequent transaction session with the device based on a difference between the transaction session start time and the truncation time.

In a thirty-seventh example and in furtherance of any of the previous examples, an article comprising a computer-readable storage medium containing a plurality of instructions that when executed enable a computing device to exit a standby mode of operation at the transaction session start time where at least a transceiver is in a power saving state.

In a thirty-eighth example and in furtherance of any of the previous examples, an article comprising a computer-readable storage medium containing a plurality of instructions that when executed enable a computing device to determine a delta network allocation vector time equaling the difference between the transaction session start time and the truncation time and add the delta network allocation vector time to a preset transaction session start time to shift the subsequent transaction session start time.

In a thirty-ninth example and in furtherance of any of the previous examples, an article comprising a computer-readable storage medium containing a plurality of instructions that when executed enable a computing device to determine whether subsequent transaction sessions for the apparatus and the device overlap subsequent transaction sessions for other devices after the subsequent transaction session start time has been shifted and shift subsequent transaction session start times until the transaction sessions for the apparatus and the device do not overlap transaction sessions for the other devices.

In a fortieth example and in furtherance of any of the previous examples, an article comprising a computer-readable storage medium containing a plurality of instructions that when executed enable a computing device to communicate a transaction start time using a grant frame and a contention-free end (CF-End) frame, the grant frame comprising a duration field having duration information and a dynamic allocation information field having allocation duration information, the CF-End frame comprising a duration field having duration information for the CF-End frame.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus, comprising:
    a memory;
    a transceiver coupled with at least one antenna; and
    a processor component to initiate a transaction session at a transaction session start time to communicate a transaction via the transceiver between the apparatus and a device,
    the transceiver to receive a first frame comprising information indicating an occurrence of another transaction session between other devices and a time reservation to reserve time for the other transaction session and to receive a second frame comprising second information indicating a truncation of the other transaction session at a truncation time and before an expiration of the time reservation, and
    the processor component to shift a subsequent transaction session start time for at least one subsequent transaction session between the apparatus and the device based on a difference between the transaction session start time and the truncation time.

2. The apparatus of claim 1, the transceiver to receive the first frame during a listening period of the transaction session to determine if other devices are communicating on a channel to communicate the transaction during the transaction session.

3. The apparatus of claim 1, the processor component to cause at least the transceiver to exit a standby mode of operation at the transaction session start time where at least the transceiver of the apparatus is in a power saving state.

4. The apparatus of claim 1, the first frame comprising a clear-to-send (CTS) frame or a request-to-send (RTS) frame communicated by one of the other devices.

5. The apparatus of claim 1, the second frame comprising a contention-free end (CF-End) frame communicated by one of the other devices.

6. The apparatus of claim 1, the processor component to determine a delta network allocation vector time equaling the difference between the transaction session start time and the truncation time and add the delta network allocation vector time to a determined transaction session start time for the subsequent transaction session to shift the subsequent transaction session start time.

7. The apparatus of claim 1, the processor component to determine whether subsequent transaction sessions for the apparatus and the device overlap subsequent transaction sessions for other devices after the subsequent transaction session start time has been shifted and to shift subsequent transaction session start times until the transaction sessions for the apparatus and the device do not overlap transaction sessions for other devices.

8. The apparatus of claim 1, the processor component to communicate, via the transceiver, a transaction start time using a grant frame and a contention-free end (CF-End) frame, the grant frame comprising a duration field having duration information and a dynamic allocation information field having allocation duration information, the CF-End frame comprising a duration field having duration information for the CF-End frame.

9. The apparatus of claim 1, comprising:
    a housing comprising the memory, the processor component, the transceiver, and further comprising:
    a display;
    an input/output (I/O) device.

10. A computer-implemented method, comprising:
    initiating, by processing circuitry, a transaction session at a transaction session start time to communicate a transaction between a first device and a second device;
    receiving, by the processing circuitry, a first frame comprising information indicating an occurrence of another transaction session between other devices and a time reservation to reserve time for the other transaction session;
    receiving, by the processing circuitry, a second frame comprising second information indicating a truncation of the other transaction session at a truncation time and before an expiration of the time reservation; and
    shifting, by the processing circuitry, a subsequent transaction session start time for at least one subsequent transaction session between the first device and the second device based on a difference between the transaction session start time and the truncation time.

11. The computer-implemented method of claim 10, the first frame received during a listening period of the transaction session to determine if other devices are communicating on a channel to communicate the transaction during the transaction session.

12. The computer-implemented method of claim 10, comprising:
    exiting, by the processing circuitry, a standby mode of operation at the transaction session start time by the first device and the second device where at least a transceiver of the first device or the second device is in a power saving state.

13. The computer-implemented method of claim 10, the shifting the subsequent transaction session start time comprising:
    determining a delta network allocation vector time equaling the difference between the transaction session start time and the truncation time; and
    adding the delta network allocation vector time to a determined transaction session start time for the subsequent transaction session to shift the subsequent transaction session start time.

14. The computer-implemented method of claim 10, comprising:
    determining, by the processing circuitry, whether subsequent transaction sessions for the first device and the second device overlap subsequent transaction sessions for other devices after the subsequent transaction session start time has been shifted; and shifting, by the processing circuitry, subsequent transaction session start times until the transaction sessions for the first device and the second device do not overlap transaction session for other devices.

15. The computer-implemented method of claim 10, comprising:

communicating, by the processing circuitry, a transaction start time using a grant frame and a contention-free end (CF-End) frame, the grant frame comprising a duration field having duration information and a dynamic allocation information field having allocation duration information, the CF-End frame comprising a duration field having duration information for the CF-End frame.

16. A non-transitory computer-readable storage medium containing a plurality of instructions that when executed enable a computing device to:

initiate a transaction session at a transaction session start time to communicate a transaction between a first device and a second device;

receive a first frame comprising information indicating an occurrence of another transaction session between other devices and a time reservation to reserve time for the other transaction session;

receive a second frame comprising second information indicating a truncation of the other transaction session at a truncation time and before an expiration of the time reservation; and shift a subsequent transaction session start time for at least one subsequent transaction session between the first device and the second device based on a difference between the transaction session start time and the truncation time.

17. The non-transitory computer-readable storage medium of claim 16, comprising instructions that when executed enable the computing device to exit a standby mode of operation at the transaction session start time by the first device and the second device where at least a transceiver of the first device or the second device is in a power saving state.

18. The non-transitory computer-readable storage medium of claim 16, comprising instructions that when executed enable the computing device to:

determine a delta network allocation vector time equaling the difference between the transaction session start time and the truncation time; and add the delta network allocation vector time to a determined transaction session start time for at least one subsequent transaction session to shift a transaction session start time for the at least one subsequent transaction session.

19. The article of claim 16, comprising instructions that when executed enable the computing device to:

determine whether subsequent transaction sessions for the first device and the second device overlap subsequent transaction sessions for the other devices after the subsequent transaction session start time has been shifted; and shift subsequent transaction session start times until the transaction sessions for the first device and the second device do not overlap transaction session for the other devices.

20. The article of claim 16, comprising instructions that when executed enable the computing device to communicate a transaction start time using a grant frame and a contention-free end (CF-End) frame, the grant frame comprising a duration field having duration information and a dynamic allocation information field having allocation duration information, the CF-End frame comprising a duration field having duration information for the CF-End frame.

* * * * *